United States Patent [19]

Faulkner et al.

[11] 4,453,807

[45] Jun. 12, 1984

[54] SYSTEM FOR HANDLING SLIDES

[76] Inventors: Albert A. Faulkner, 160 Arden Rd., Conshohocken, Pa. 19428; John C. Bouton, 22 Regina Pl., R.D. 4, Doylestown, Pa. 18901

[21] Appl. No.: 274,690

[22] Filed: Jun. 17, 1981

[51] Int. Cl.³ .............................................. G02B 21/26
[52] U.S. Cl. ..................................... 350/529; 350/534; 356/244; 414/129
[58] Field of Search ............... 350/529, 530, 531, 532, 350/534, 535, 536; 356/39, 244; 353/26 A, 27 A; 414/107, 129

[56] References Cited

U.S. PATENT DOCUMENTS

| | | | |
|---|---|---|---|
| 1,847,812 | 3/1932 | Burton et al. | 414/107 X |
| 3,738,730 | 6/1973 | Binnings et al. | 350/529 |
| 3,741,410 | 6/1973 | Henschke et al. | 414/129 |
| 3,743,400 | 7/1973 | Haning et al. | |
| 3,764,215 | 10/1973 | Wallach | 356/244 X |
| 3,851,972 | 12/1974 | Smith et al. | |
| 4,159,875 | 7/1979 | Hauser | |
| 4,174,178 | 11/1979 | Ouchi et al. | 356/244 X |
| 4,248,498 | 2/1981 | Georges | |
| 4,302,420 | 11/1981 | Jaubowicz et al. | 356/244 X |

FOREIGN PATENT DOCUMENTS

| | | | |
|---|---|---|---|
| 340701/71 | 10/1967 | Japan | 353/27 A |
| 53-100570 | 2/1978 | Japan | 414/129 |
| 845424 | 8/1960 | United Kingdom | 414/107 |

OTHER PUBLICATIONS

Livingstone, "Cytology Automation, Proc. Second Tenovus Symposium," Cardiff, Oct. 24-25, 1968, Edinburgh & London, 1970, pp. 26, 142 & 150.
Megla, *Acta Cytologica*, vol. 17, No. 1, *Int. Acad. Cyt.* Corning, "The Corning LARC Classifier", Jun. 1973 Bulletin.

Primary Examiner—William L. Sikes
Assistant Examiner—Matthew W. Koren
Attorney, Agent, or Firm—Caesar, Rivise, Bernstein & Cohen, Ltd.

[57] ABSTRACT

A system for transporting a tray holding at least one specimen slide to and from the microscope. The tray includes index marker means and engagement means. The system comprises an input station, indexing means at the microscope stage and an output station. The input station includes a hopper to receive a stack of slide-carrying trays, a first carrier located within the hopper to carrying the trays out of the hopper and onto the microscope stage and feeding means for dispensing the trays from the stack to the first carrier. The indexing means carries the tray to at least one predetermined index position on the stage and basically comprises a second carrier for moving the tray across the stage and a first sensor cooperating with the second carrier means. The index marker means activates the first sensor to stop the second carrier when the index marker means is in a first predetermined position corresponding to the tray being in the predetermined index position. The second carrier carries the tray horizontally from the predetermined index position to the output station.

The output station receives the tray from the microscope stage and dispenses it into a storage container and basically comprises a tilt-table which is pivotable from a horizontal position to a vertical position. The table pivots when the tray has reached a predetermined idle position thereon.

The operation of the entire system is under microprocessor control so that inputting and outputting occur at the same time.

34 Claims, 17 Drawing Figures

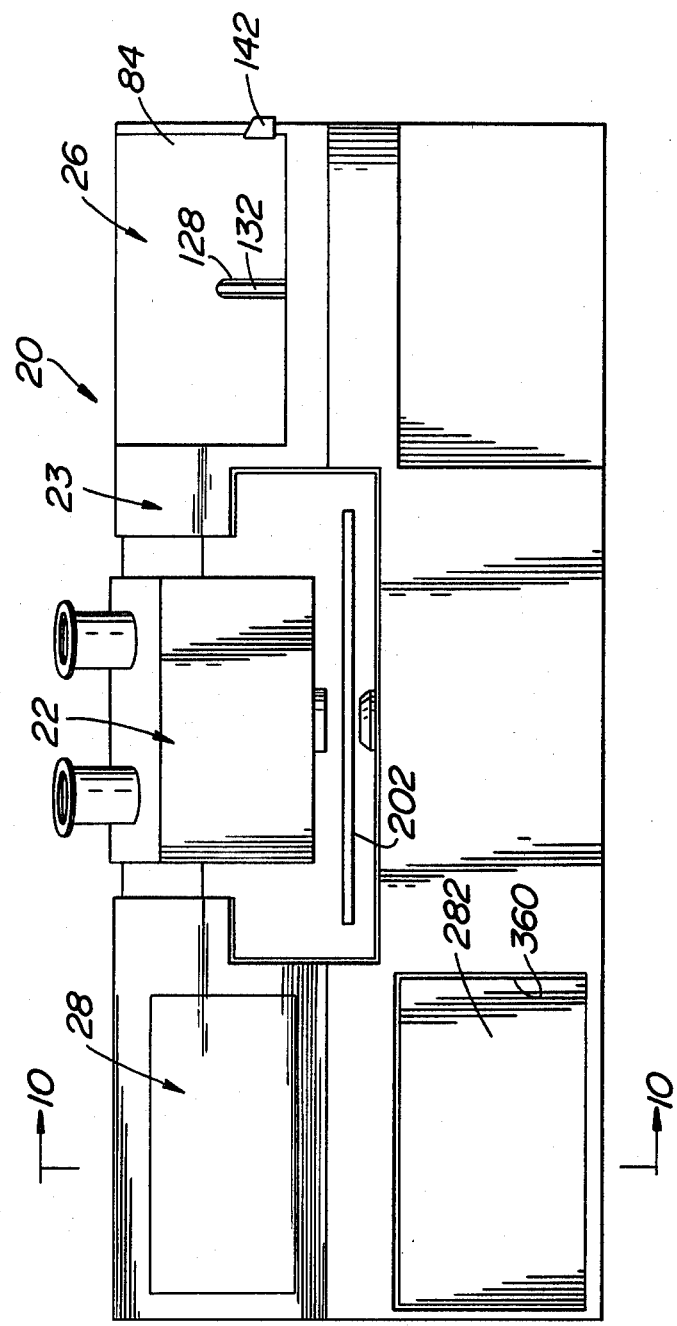

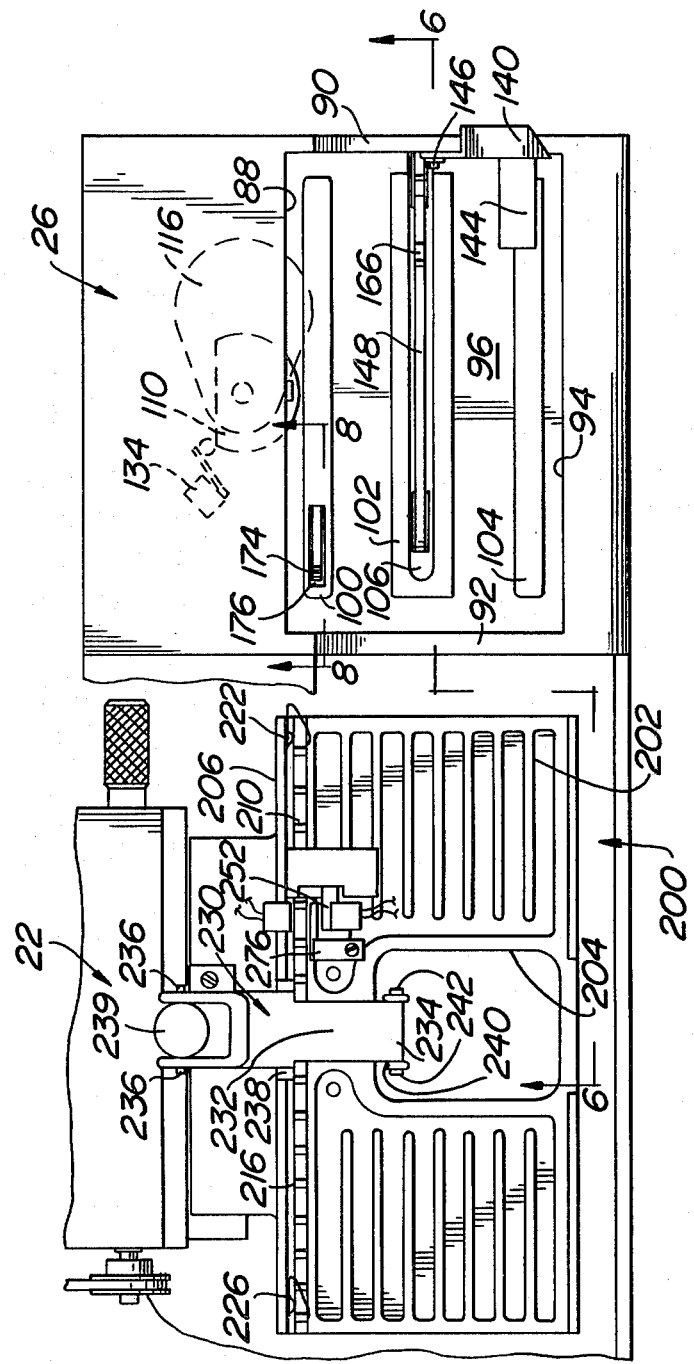

SYSTEM FOR HANDLING SLIDES

This invention relates generally to microscopes and other examination devices and more particularly, to apparatus for holding a microscope slide and for effecting the transportation of the slide to and from a microscope.

Mechanized or automated microscopic analysis of specimens is gaining wider acceptance in various technological applications, e.g., blood analysis.

Prior art system such as used for automatic blood analysis commonly include a microscope having a platen which is positioned along any of three orthogonal axes under automated control and an analyzer for controlling the positioning of the platen and a pattern recognition system for analyzing the specimen within the field of view of the microscope. Examples of prior art anaylzer technology is shown and claimed in the following U.S. patents assigned to Geometric Data Corporation, the assignee of the instant invention, and which technology is used in its analyzers sold under the trademark HEMATRAK: U.S. Pat. Nos. 3,827,804; 3,832,687; 3,873,974 and 4,012,634.

Various techniques have been utilized in the prior art to move a specimen-bearing slide to the field of view of the microscope. One technique used heretofore involves the manual positioning of the slide on the microscope stage followed by the manual alignment and focusing on a particular portion of the specimen, e.g., a particular type of blood cell. The analyzer is then initiated to effect the automatic analysis of the specimen. An improvement of the foregoing manual technique is a semi-automatic technique entailing the manual positioning of the slide within the field of view of the microscope followed by the automatic positioning and focusing of the slide on its specimen under control of the anaylzer itself.

Mechanized transportation of slides to and from the microscope stage has been accomplished heretofore by the use of cassettes or other devices for holding plural slides therein. The slides are withdrawn from the cassette by transport means and carried to the microscope stage for automatic analysis. Once the analysis is completed, the slide is returned to its position within the cassette and then the next slide extracted from the cassette for analysis. An example of such a system is shown in U.S. Pat. No. 4,248,498.

The aforementioned HEMATRAK analyzer also utilizes a cassette system in which plural slides are disposed and registered for cooperation with mechanized transport means to extract the slide and carry it to the microscope stage for analysis.

Prior art cassette-based slide transportation systems have the advantage over prior art manual or semi-automated systems by eliminating the need for manual placement of the slide on the stage for analysis. In addition, the prior art cassette systems and their associated mechanized transports enable the precise repositioning of a slide on the platen after it has been automatically analyzed to permit reexamination of a specific portion of the specimen. This latter feature is of considerable importance and is frequently necessary when the analyzer, during the automated mode of operation, detects a significant predetermined characteristic of the specimen requiring later reexamination.

While precise repositioning or reregistration of a slide on the platen is accomplished by prior art cassette-based slide transportation systems, such systems require that the slide be returned to its original location within the cassette in order to effect such reregistration. Another disadvantage of the prior art cassette systems is that such systems operate in what may be called a "serial" mode since the anlaysis of each slide can only occur after a previously analyzed slide has been returned to the cassette. This "serial" mode of operation severely limits the speed of operation, that is, the number of slides which can be analyzed in a given period of time, without necessitating an extremely complex and expensive transport mechanism.

In U.S. Pat. No. 4,159,875, there is disclosed a slide specimen holder in which a single slide is constrained. The holder is stackable with similar holders so that the slide holders can be fed sequentially from an input station to a microscope and then to an output station. The system for transporting the holders appears to overcome the disadvantages of the prior art "serial" transportation systems, in that the inputing and outputing of slides appears to be accomplished at the same time. The slide transportation operation of said patent can be characterized as being a "parallel" operation. While such a system would ostensibly offer speed advantages over prior art "serial" transportation systems, the system appears to suffer from the drawback of limited registrability of the slide holder on the microscope platen for re-examination of a predetermined portion of the specimen after the slide holder had been removed from the platen.

Accordingly, it is a general object of the instant invention to provide a slide-holding tray and a system for transporting the same which overcomes the disadvantages of the prior art.

It is a further object of the instant invention to provide a tray for holding a specimen-carrying slide therein to enable the slide to be readily transported to a microscope station and for effecting precise indexing and registration of said slide thereat.

It is a further object of the instant invention to provide a system for transporting slide to and from a microscope stage for automatic analysis thereat and which system enables the transportation to and from the stage to be accomplished during the analysis operation.

It is a further object of the instant invention to provide a tray for at least one microscope slide which is simple in construction, low in cost and facilitates the mechanized examination of a specimen on the slide.

It is a further object of the instant invention to provide an automated system for carrying specimen-bearing slides sequentially to and from a microscope station.

These and other objects of the instant invention are achieved by providing a device for holding a specimen-bearing slide for location on an automated microscope stage at at least one predetermined indexed position and a transportation system for moving the device to and from the microscope stage.

The device is in the form of a tray to which the slide is fixedly secured and includes index marker means associated with the slide for cooperation with sensor means at the microscope stage to indicate the location of the slide at the predetermined indexed position.

The transportation system comprises an input station, indexing means at the microscope stage and an output station. The input station comprises hopper means to receive a stack of trays, first carrier means located within the hopper means for sequentially carrying trays out of the hopper means and onto the microscope stage, and feeding means for sequentially dispensing trays from the stack in the hopper means to the carrier means.

The indexing means at the microscope stage includes second carrier means for moving the tray across the stage and first sensor means for cooperation with the second carrier means. The index marker means of the tray is arranged to activate the first sensor means to stop the second carrier means from moving the tray when the index marker means is in a first predetermined position on the stage. The second carrier means is arranged to carry the tray horizontally from the predetermined indexed position to the output station.

The output station is arranged to receive the horizontally disposed tray to dispense it into a storage container for removal from the system. The output station comprises tilt-table means pivotable from a horizontal orientation in which the tray is received to a vertical orientation in which the tray is dispensed into the container. The table pivots when the tray is in a predetermined idle position on the table.

Other objects and many of the attendant advantages of the instant invention will be readily apparent by reference to the accompanying drawing wherein:

FIG. 1 is a front elevational view of an automated microscope apparatus including a slide transportation system of the instant invention;

FIG. 2 is an enlarged, top plan view of the input station and microscope stage of the apparatus shown in FIG. 1;

Figure 2A:
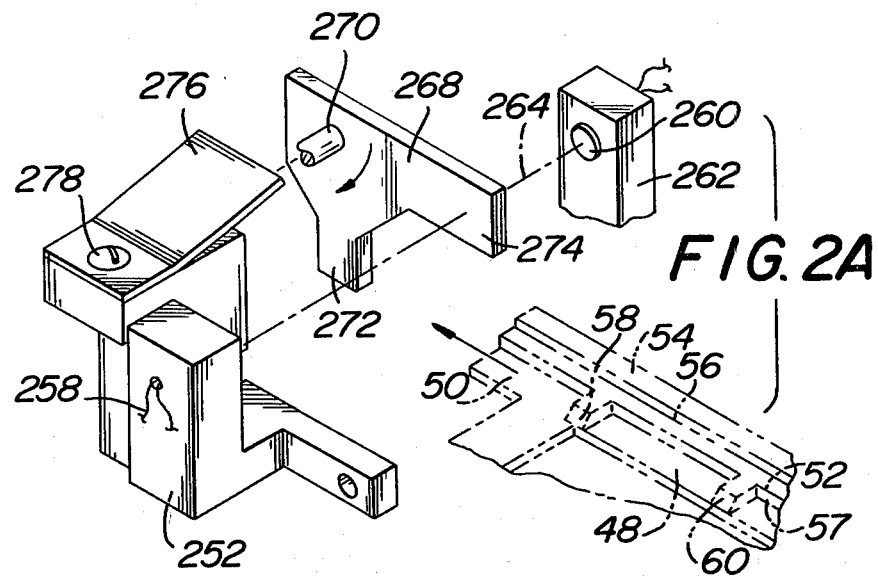
FIG. 2A is an exploded perspective view of a portion of sensor means shown in FIG. 2.

Referring now to the various figures of the drawings wherein like reference characters refer to like parts, there is shown a specimen slide transportation system 20 constructed in accordance with the instant invention for use with an automated microscope and pattern recognition system 22, such as used for performing blood smear analyses. The system or analyzer 22 can take any form, such as the automatic analyzer sold by Geometric Data Inc. of Wayne, PA under the trademark HEMATRAK, and does not constitute a portion of the instant invention except that the slide supporting platen of the microscope includes indexing means constructed in accordance with the invention to effect slide alignment, registration and indexing on the platen. The slide transportation system 20 and a portion of the microscope stage of the analyzer 22 are disposed within a unitary housing 23 which is preferably formed of die-cast metal.

The slide transporting system 20 of the instant invention makes use of a carrier or tray 24, also forming a part of this invention and to be described hereinafter, on which at least one specimen holding slide is mounted. The term "slide" as used herein not only refers to conventional specimen-bearing slides, such as are formed of glass or plastic and are normally rectangular in shape, but also refers to any substrates on which or in which a specimen to be examined is mounted. In a preferred embodiment of the invention shown herein in FIGS. 1-13, the tray 24 is shown mounting a plurality of conventional specimen-carrying glass slides. The tray 24 is arranged to be carried through the system 20 from an input station 26 (FIG. 1) to the automated microscope 22 of the analyzer 22 and then to an output station 28.

As will be appreciated from the detailed description of the system set forth hereinafter, the slide transportation system of the instant invention is a "parallel" type system in that the trays bearing the slides are fed from the input station to the microscope stage, while trays are fed from the microscope stage to the output stage. The "parallel" operation offers a decided speed advantage over prior art "serial" slide transportation systems which require the completion of a full cycle of operation for one slide before a second slide can be picked up for analysis.

Figure 4:
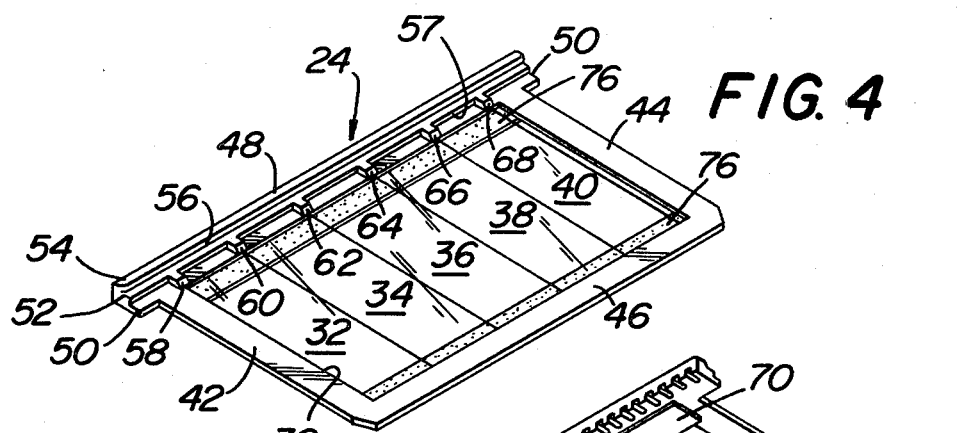
FIG. 4 is a perspective view showing the top of one embodiment of a slide-carrying tray of the instant invention.
Figure 5:
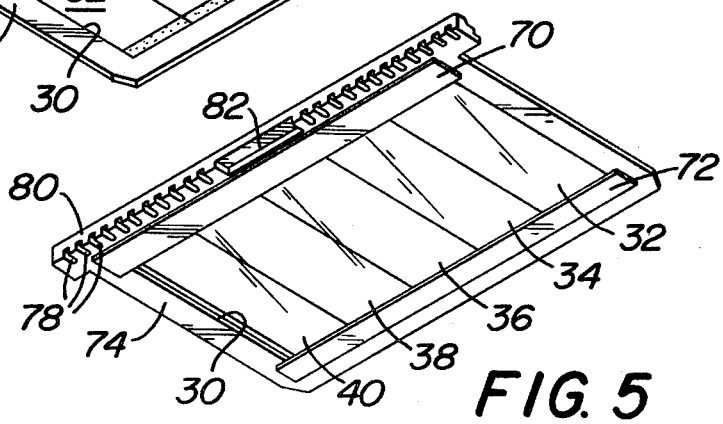
FIG. 5 is a perspective view of the underside of the tray shown in FIG. 4.

The tray 24 is shown clearly in FIGS. 4 and 5 and basically comprises a rectangular frame, preferably formed of plastic, having a central opening or window 30 in which five glass slides 32, 34, 36, 38 and 40 are mounted in a side-by-side array. The slides are identical in construction to one another and each bears a respective specimen e.g. blood smear, to for automated analysis, e.g., a white blood cell differential, by the analyzer 22.

The frame is a generally planar member having a leading side wall 42, a trailing side wall 44, a bottom side wall 46 and a top side wall 48. The walls 42-48 are co-planar and define the periphery of the window 30. The window is dimensioned so that the five slides fit precisely therein. The top wall is longer than the bottom wall and includes a pair of ears 50 which project beyond the leading and trailing edges of the sidewalls 40 and 44, respectively. An elongated rib 52 extends along the full length of the top wall 48 for the full length thereof. An elongated rail 54 extends along the top of the rib for the full length of the rib. The rail includes an inclined front face 56 forming the interface between the top surface of the rail 54 and the top surface of the rib 52. The leading edge of the rib 52 is rounded, as is the leading edge of the front face 56 of the rail, for reasons to be described later.

A plurality of projections or tic markers extend from the rib 52 to the top edge of the window 30. Each tic marker is of narrow width and of the same height as that of the rib 52. The front face of the rib 52 between the tic markers is denoted by the reference numeral 57 and is a vertical surface.

The tic markers serve as timing or sensor markers to enable the sequential indexing and positioning of the tray 24 on the microscope platen, as will be described later, to enable the apparatus 22 to determine the position of the tray on the microscope platen. Such action is necessary to perform the automated sequential analysis of each of the slides 32–40 mounted in the tray. To that end, the tic markers are located along the longitudinally extending rib 52 at equadistantly spaced locations, with the first tic marker 58 being aligned (centered) with the leftmost or leading edge of the window 30. The leading edge of the first slide 32, when mounted in the tray, is aligned with the first tic marker 58. The second tic marker 60 is spaced from the first tic marker by the width of the slide so that the second tic marker 60 is aligned with the trailing edge of the first slide 32 and the leading edge of the second slide 34. In a similar manner, the third tic marker 62 is aligned with the trailing edge of the second slide 34 and the leading edge of the third slide 36, while the fourth tic marker 64 is aligned with the trailing edge of the third slide 36 and the leading edge of the fourth slide 38, the fifth tic marker 66 is aligned with the trailing edge of the fourth slide 38 and the leading edge of the fifth slide 40, and the sixth tic marker 68 is aligned with the trailing edge of the fifth slide 40. The trailing edge of the fifth slide 40 coincides with the trailing edge of window 30.

The slides 32–40 are held within the window of the tray by a pair of elongated tape strips 70 and 72. The strip 70 is wider than the stip 72. The strips 70 and 72 are adhesively secured to the underside surface 74 of the tray continuous with the upper and lower edges of the window 30 and extending into the window. Each strip includes a surface portion 76 having an adhesive thereon and extending into the window. A liner strip (not shown) is releasably secured over the adhesive surface 76 of each strip to protect the adhesive until the slides are ready to be mounted in the tray. At that time, the liner strips are peeled away, thereby exposing the adhesive. The slides are then disposed within the window 30 so that their longitudinal marginal edges are adhesively secured to the tape strips 70 and 72.

Since the slides are treated with various materials, such as dye, alcohol, or other chemicals, prior to analysis, the plastic forming the tray is preferably impervious to such materials. One particularly effective plastic for the tray is 40% polypropylene.

As can be seen in FIG. 5, the underside surface 74 of the tray includes a plurality of notches 78 disposed at equadistantly spaced locations therealong. The notches 78 extend inward from the edge 80 of the top wall of the frame 48 and are of a depth equal to approximately the thickness of the portion 48. The notches 78 form a plurality of teeth therebetween which are adapted to be gripped by means at the input station 26, the microscope station 22 and the output station 28 to effect the movement of the tray 24 between such stations and the positioning of the tray at each station. An enlarged recess or notch 82 is located in the middle of the group of notches 78.

The enlarged recess 82 and the underside 74 of the tray 24 serves two functions. In that regard it cooperates with means at the input station to separate each tray from a stack of trays for carriage to the microscope station. In addition, the recess 82 cooperates with means at the output station to position the tray at an "idle" position for ejection into a storage box.

Each tray may be coded to carry various information, e.g., patient, type, etc. The coding may take any form, such as, physical indicia, e.g., holes, notches, etc., magnetic indicia, optically readable indicia, e.g., bar codes, etc., or the tray itself can be color coded by being formed of a plastic having coloring dye(s) therein.

Figure 6A:
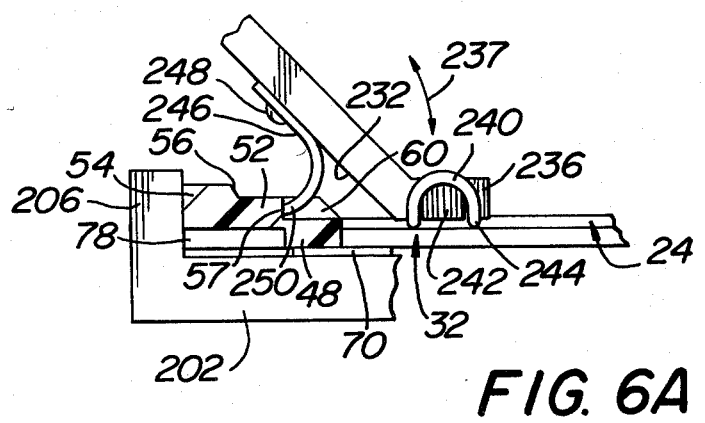
FIG. 6A is an enlarged, side elevational view, partially in section, and showing a portion of a clamping hold-down assembly shown in FIG. 6.
Figure 3:
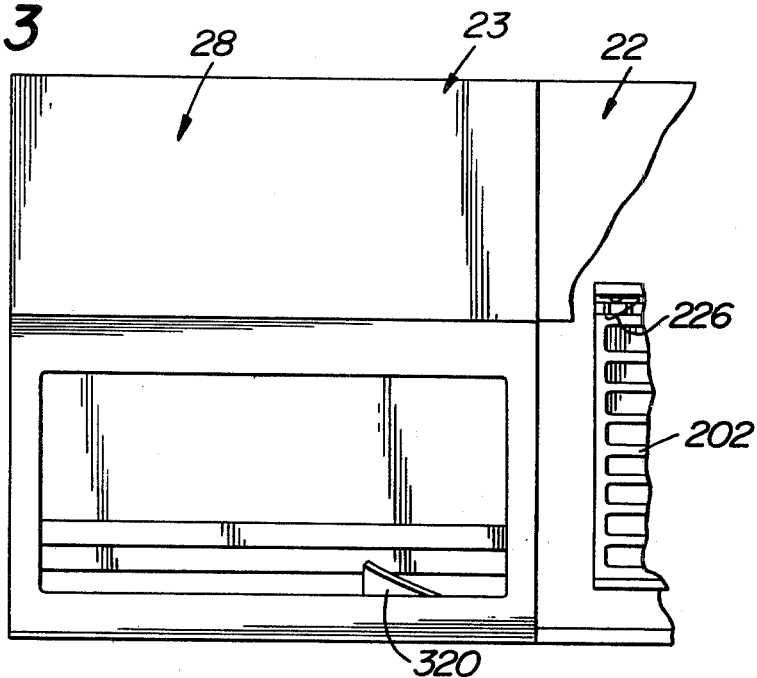
FIG. 3 is an enlarged plan view of a portion of the microscope stage and output section of the apparatus shown in FIG. 1.
Figure 6:
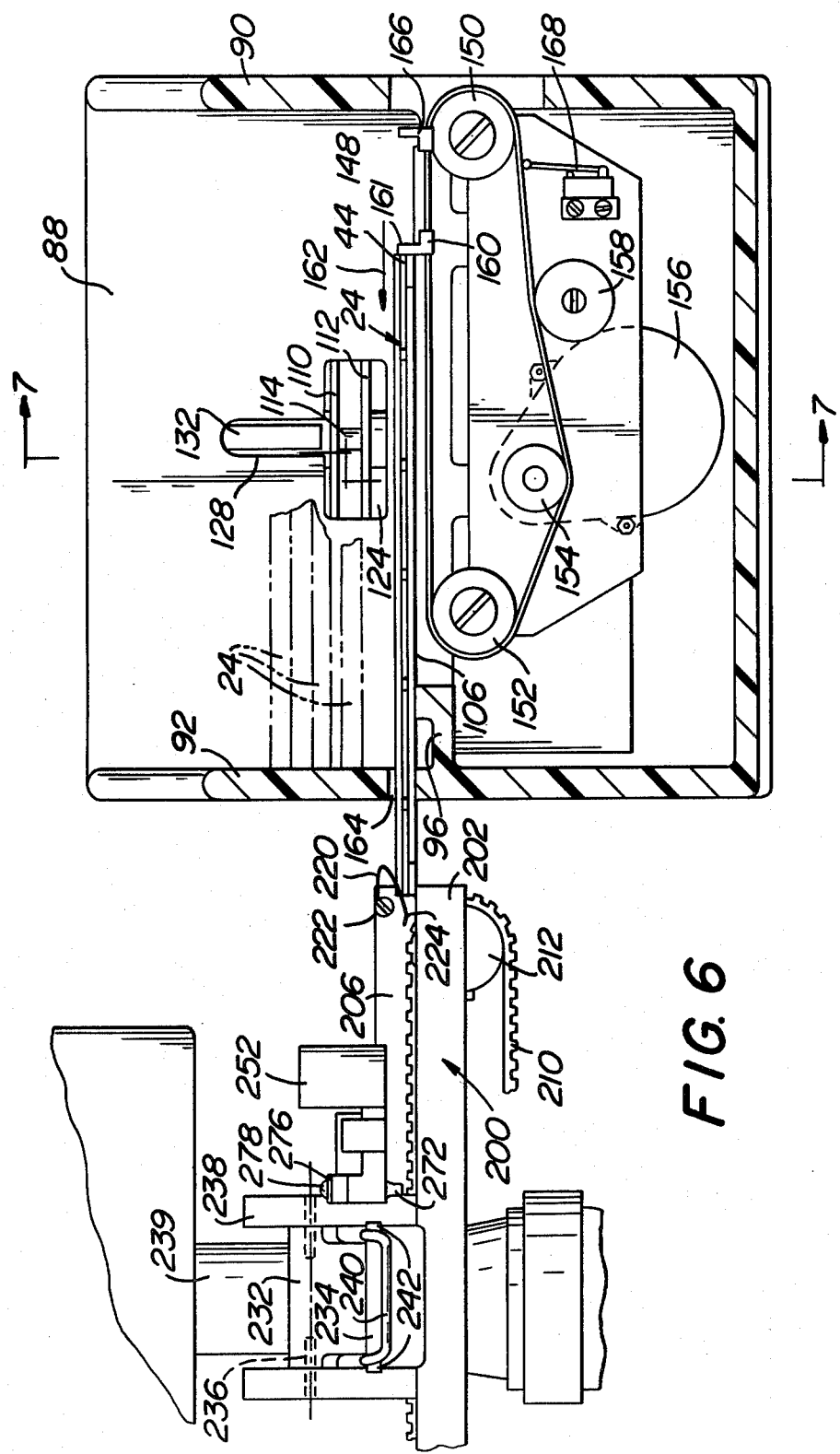
FIG. 6 is an enlarged sectional view taken along line 6—6 of FIG. 2.
Figure 7:
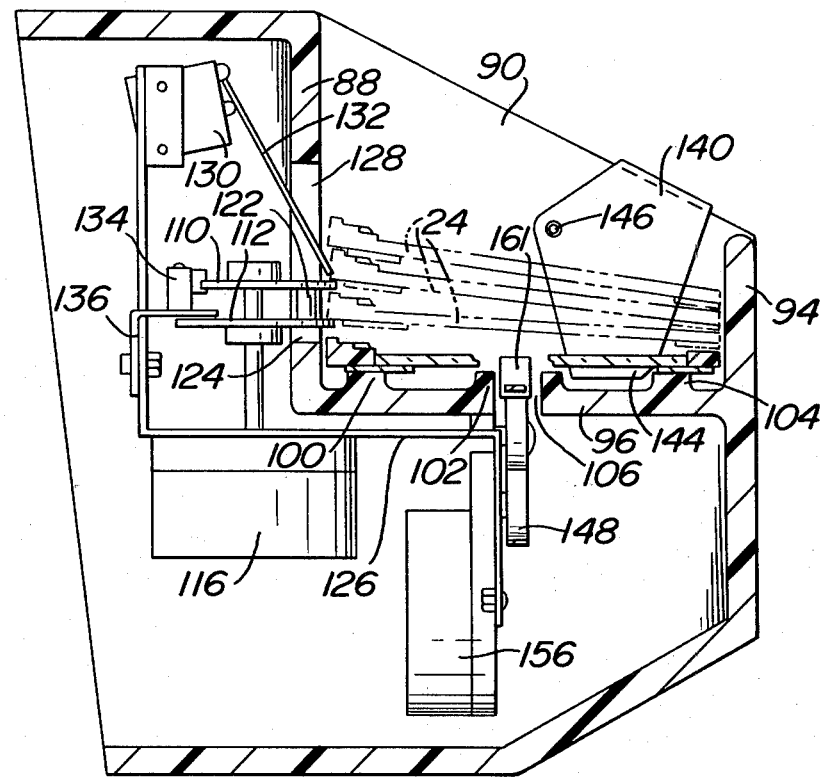
FIG. 7 is a sectional view taken along line 7—7 of FIG. 6.
Figure 9:
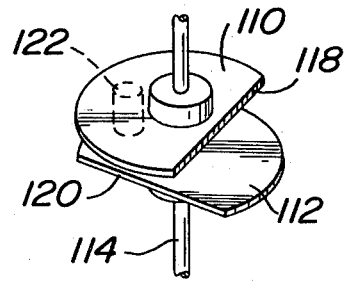
FIG. 9 is a perspective view of a portion of the input stage shown in FIG. 7.

Referring now to FIGS. 1, 2 and 6–9, the details of the input section will be discussed. The input section or stage is arranged to receive a stack of plural trays 24, each of which having five slides mounted thereon, and to feed the trays sequentially to the microscope stage for automatic analysis. To that end, as can be seen in FIG. 1, the input stage or station 26 includes a tray receiving hopper 84 in the form of a rectangular depression in the portion of the housing 23 defining the input station. The hopper includes a back wall 88, an upstream sidewall 90, a downstream sidewall 92, a front wall 94 and a bottom wall 96. The front wall 94 is substantially lower in height than the rear wall, as shown in FIG. 7, so that the opening to the interior of the hopper is slanted downward for ease of access. The hopper is rectangular in shape and is of sufficient size to readily accommodate a stack of trays 24 therein.

Means, to be described hereinafter, are provided at the input station to feed the trays of the stack sequentially to the microscope stage. Such means to separate the bottom-most tray of the stack from the remaining trays and allow it to drop to the bottom wall of the hopper for engagement by carrier means to move the tray out of the hopper and onto the microscope stage or platen.

The bottom wall of the hopper includes three ribs or rails 100, 102 and 104 projecting slightly upward from the top surface thereof and extending parallel to each other between the opposed sidewalls 90 and 92. The rails keep the dropped tray off the bottom surface of the hopper, thereby reducing the frictional engagement between the tray and the the hopper as the tray is fed to the microscope stage.

An elongated slot extends down the center rail 102 and receives a drive belt, to be described later, to carry the tray out of the hopper.

The means which effect the dropping of the trays, one at a time, to the lowermost position within the bottom of the hopper for transportation to the microscope stage basically comprises a rotary cam assembly 108. The cam assembly 108 includes an upper cam member 110 and a lower cam member 112, both mounted on a vertically oriented output shaft 114 of a small electric motor 116. Each cam is a planar disc of generally circular configuration and having a flatted side. To that end, cam 110 includes a flatted side 118, while cam 112 includes a flatted side 120. The two cams are fixedly mounted on the shaft 114 so that the cams are parallel to each other but spaced by a distance slightly greater than the maximum thickness of the tray 24, that is, the thickness of the tray at the rail portion 54. The flatted edges 118 and 120 are disposed at an angle of approximately 120° to each other. A small cylindrical plug 122 is fixedly secured between the two cams 110 and 112 adjacent the flatted end 120 and located slightly inward radially from the circular periphery of both of said cams. The plug 22 serves as a pusher to insure that the tray is properly positioned prior to being dropped onto the bottom of the hopper to facilitate the dropping action, as will be described later.

The cams 110 and 112 are mounted in the housing 23 behind the rear wall 88 of the hopper. However, peripheral circular portions of the cams 110 and 112 are enabled to extend into the hopper through a horizontally disposed slot 124 in the back wall 88 as the cams are rotated. The motor 116 is mounted on a bracket 126 fixedly secured to the underside of the hopper's bottom wall 96. A vertically extending slot 128 is also provided in the back wall 88 of the hopper and intersects the slot 124 to form an inverted T-shaped opening in the back wall (see FIG. 6).

The radius of each cam is sufficiently large so that a portion of its circular periphery extends sufficiently into the hopper 86 to preclude any trays stacked thereabove from dropping therebelow until the cam has rotated to the rotary position wherein its flatted portion is within the slot 124. The upper cam 110 is arranged to sequentially allow a tray to drop from the position immediately above the cam to an intermediate position between it and the lower cam 112. The lower cam 112 is arranged to sequentially allow the tray interposed between it and the upper cam 110 to drop down onto the rails 100–104 on the bottom of the hopper for transportation to the microscope stage. By virtue of the fact that the flatted ends 118 and 120 are disposed at an approximately 120° angle to each other, no trays will drop at the same time.

The rotation of the cams 110 and 112 by motor 116 is controlled by the operation of microprocessor circuitry (not shown). Switch means are provided at the input station to provide a signal to the microprocessor when a stack of trays 24 has been inserted into the hopper. The switch means basically comprises a microswitch 130 mounted on an upwardly projecting portion of the bracket 126 above the cam 110. The microswitch 130 includes an actuating arm or lever 132 which projects through the vertical slot 128 into the hopper.

When a stack of trays 124 is inserted into the hopper 86 the lower wall portion of the lowermost tray of the stack rests on the bottom of the hopper, while the upper wall portion rests on the arcuate peripheral portion of the upper cam 110 projecting through the slot 124 into the hopper. The top edge 80 of the lowermost tray contacts the free end of the lever 132 pivoting it into the vertical slot 128, which action results in the closure of the microswitch 132 and the provision of an electrical signal to the microprocessor. The system is then ready to operate to feed trays to the microscope stage. Such feeding is accomplished in response to the manual depression of a "start" button (not shown).

Prior to actuation of the start button, the cams 110 and 112 are in the "home" rotary position wherein a circular peripheral portion of cam 110 extends through slot 124 and into the hopper 84. This cam position prevents the lowermost of the stack of trays from dropping to the bottom of the hopper.

A "home" position microswitch 134 is mounted on a bracket portion 136 immediately adjacent cam 110. The microswitch 134 includes an arm which cooperates with the periphery of the cam 110 so that when the cam assembly is in the "home" position the switch is closed and an electrical signal is provided to the microprocessor indicating the existence of the cams in the home position.

Operation of the components of the input station for effecting the sequential dropping of trays 24 of the stack is as follows:

When a stack of trays 24 is inserted into the hopper, the microswitch arm 132 is pivoted by the contact with the lowermost tray of the stack, thereby closing the microswitch 130. This action is sensed by the microprocessor control to enable the apparatus to commence operation upon actuation of the start button by the operator. Once the start button is depressed, the motor 116 commences operation under the microprocessor control, whereupon the cams 110 and 112 commence rotation in unison. Prior to that rotation, a portion of the arcuate peripheral edge of the uppermost cam 110 extends through the horizontal slot 124 into the hopper 84. Thus, the lowermost tray 24 of the stack is prevented from dropping fully to the floor of the hopper by that portion of the cam extending under the top edge 80 of the tray 24. The lower wall of the lowermost tray will, however, be disposed on the bottom wall 96 of the hopper. When the cams have rotated to the position wherein the flatted portion 118 of upper cam 110 is inside the slot 124 in the hopper wall, the lowermost tray 24 drops down. At this point an arcuate peripheral portion of the lowermost cam 112 extends through the slot to stop the fall of the tray and hold the tray on it. The continued rotation of the cams causes the pusher 122 to make contact with the top edge 80 of the tray on the bottom cam forcing the tray forward in the hopper so that its bottom side 46 is closely adjacent the front wall 94 of the hopper. This feature is of considerable importance to insure that each tray, when released by the bottom cam, is enabled to drop unimpeded by frictional engagement with the back wall, since each tray drops to the floor of the hopper by pivoting through a small arc about the lower edge of the tray which is already on the hopper floor.

As can be seen in FIG. 7, the spacing between the cams 110 and 112 is slightly greater than the maximum thickness of the tray. Accordingly, after a tray is dropped onto the lowermost cam and pushed forward in the hopper, the continued rotation of the cam causes the circular peripheral portion of the upper cam 110 to interpose itself between the top rail 54 of the lowermost tray 24 and the elongated recess 82 in the central portion of the underside of the next succeeding or second tray. When the cams 110 and 112 reach the home position after the first rotation, the lowermost tray 24 will be located on the lowermost cam while the next succeeding tray will be supported on the uppermost cam, with the remainder of the stack of trays supported on top of the second tray. During the next cycle of rotation of the cams, the flatted portion 120 of the lowermost cam 112 rotates into the slot 124, whereupon the support for the underside edge of the lowermost tray is removed so that the tray pivots downward about its bottom wall 46 to the position shown by the solid lines in FIG. 7 wherein the tray is disposed on the rails 102 and 104 on the floor of the hopper. It is in this position that the lowermost tray is ready for transportation to the microscope stage, as will be described in detail later.

Immmediately after the dropping of the lowermost tray, the cams will have rotated to the position wherein the circular peripheral portion of the lowermost cam 112 is again within the slot 124, while the flatted portion 118 of the upper tray 110 is within the slot. Accordingly, the second tray is enabled to drop into the position between the cams 110 and 112, that is, onto the extending circular peripheral portion of the lowermost cam 112. As the cams continue to rotate, the circular peripheral portion of the upper cam 110 interposes itself between the second and the next successive, i.e., third, tray to hold the third tray on top of it. Thus, no two trays drop into any lower position at the same time.

The operation of the cams continues as described heretofore for each succeeding tray in the stack.

As can be seen clearly in FIG. 7, a lever 140 is mounted on the sidewall 90 of the hopper contiguous with the front wall 94. The lever 140 includes an extending actuating tab 142 arranged to be grasped between the user's fingers. At the opposite end of the lever is a lifting portion 144 which is in the form of a horizontally extending finger 144. The finger 144 is located immediately above the bottom wall 96 between the front rail 104 and the central rail 102. The lever is pivotably mounted on a pin 146 so that when the tab 142 is lifted by the user, the finger 144, which is located below the bottom tray of the stack, pivots in the clockwise direction as shown in FIG. 7 to lift the stack out of the hopper.

The means for transporting each tray across the hopper floor to the microscope stage comprises the heretofore mentioned drive belt 148. The drive belt 148 comprises a smooth surfaced belt or loop of resilient material, e.g., rubber, extending about a pair of rollers 150 and 152. The rollers 150 and 152 are mounted on the bracket 126 below the bottom wall 96 of the hopper and under the slot 106 in the central rail so that an elongated peripheral portion of the belt runs along the slot 106. The belt 148 is driven by a drive roller 154 which is mounted on the rotary output shaft of a small electric motor 156. The motor is mounted on the forward most portion of the bracket 126. A tension roller is mounted on the bracket 126 and rolls on the outer periphery of the belt 148 to provide sufficient tension thereto. The motor 156 is arranged to rotate first in one direction, then in the opposite direction during each sequence of operation to first cause the lowermost tray to be carried out of the hopper assembly and onto the microscope stage and then back to a home position to ready the input station to feed the next successive tray.

A pusher 160 is mounted on the belt 148 by an encircling loop and includes an upstanding finger portion 161 (FIG. 7) extending through the slot 106 and arranged to contact the edge of the trailing side 44 of the tray 24 which has dropped onto the bottom of the hopper to push the tray thereacross in the direction of the arrows 162 in FIG. 7, that is, toward the hopper's downstream sidewall 92. The downstream sidewall 92 includes an elongated slot 164 of sufficent width and height to enable a tray 24 to fit therethrough, with the slot being located in a plane contiguous with the top surface of the rails on the bottom wall of the hopper. Thus, as the motor 156 causes the belt to rotate in the counter-clockwise direction as shown in FIG. 6, the pusher's finger 161 makes contact with the trailing side edge 44 of the bottommost tray 24 to cause it to move in the direction of the arrow 162 down the rails and through slot 164 in the sideall 92 of the hopper. The leading edge 42 of the tray is then engaged by belt means at the microscope stage and which will be described in detail later, to pull the tray fully out of the hopper and onto the microscope stage platen.

After the pusher 160 has moved the tray its furthest downstream position the motor 156 is reversed, under microprocessor control, whereupon the pusher 166 is moved back towards its home position, that is, the position at the upstream most end of the slot 106. A second finger 166, similar to the pusher 160, is mounted on the belt upstream of the pusher 160. The finger 166 is arranged to trip the closure of an associated microswitch 168 when the belt 148 has been rotated back to the home position. To that end the microswitch 168 is mounted on the bracket 126 immediately below the roller 150 so that when pusher 160 is at its upstream-most position in the hopper, the finger 166 engages the arm of the micro switch 168 to close it.

Figure 8:
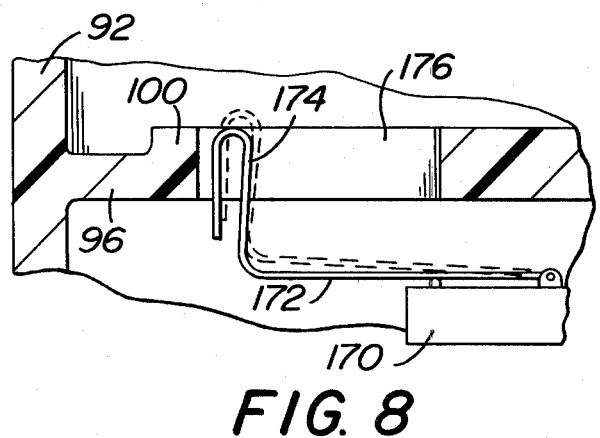
FIG. 8 is an enlarged sectional view taken along line 8—8 of FIG. 2.

As shown in FIG. 8, the hopper assembly also includes means for sensing the presence of a tray 24 on the floor of the hopper ready for transportation to the microscope stage. That sensing means comprises a microswitch 170 mounted below the bottom wall 96 of the hopper adjacent the back wall 84 and the downstream sidewall 92. The microswitch 170 includes an actuating arm 172 having a projecting portion 174 extending through a slot 176 in the downstream end of the rail 100. Accordingly, when a tray 24 is dropped into position on the rails 100, 102 and 104, the weight of the tray forces the projection 174 on the microswitch arm into the slot 176, thereby closing the microswitch 170. The closure of the switch 170 is sensed by the microprocessor, whereupon the motor is actuated to cause the drive belt 148 to carry the tray 24 out of the hopper assembly and onto the microscope stage.

Turning now to FIGS. 1, 2A, 6 and 6A, the details of the microscope stage will now be discussed. The microscope stage is arranged to receive a tray 24 of five slides from the hopper assembly and to sequentially move the slides under the objective lens of the microscope for analysis, e.g., white blood cells differentiation, by the analyzer which is connected to the microscope.

The microscope stage itself is of generally conventional construction insofar as its ability to move through three orthogonal axes, x, y and z (right-left, in-out, and up-down, respectively) by motor means (not shown) under the microprocessor control. The stage is shown generally by the reference numeral 200 and comprises a generally rectangular flat-topped platen 202 having a central opening or window 204 and a flange 106 of short height running the length of the platen along its top edge. The window 204 provides the optical path for the microscope's viewing system. The movement of the platen with respect to the microscope in the three axes is conventional and thus will not be described in detail. The movement of the tray 24 onto the microscope platen and its positioning and indexing over the window to bring each of the five slides into a desired position on the optical axis of the microscope forms a significant portion of the instant invention, and will be described in detail later. Suffice for now to state that the microscope stage 200 includes indexing means for effecting the precise positioning and registration of each tray 24 at various positions on the platen, for holding the tray in place at each position and for ejecting the tray from the platen once the complete examination sequence has been completed.

The means for moving the tray across the platen basically comprises a drive belt assembly which is arranged to cooperate with the notches 78 on the underside of the tray. Clamping means are provided on the platen to hold the tray securely in place on the platen at the predetermined indexed positions to insure that proper registration exists for accurate and precise automatic analysis. Infeed and outfeed clamping means are also provided to insure that the tray is brought into good engagement with the drive belt for ingress to and egress from the platen. Sensor means are also provided to insure that the tray is moved to the precise index positioning with respect to the window, so that each of the slides can be analyzed sequentially with great accuracy, precision and repeatability.

Figure 12:
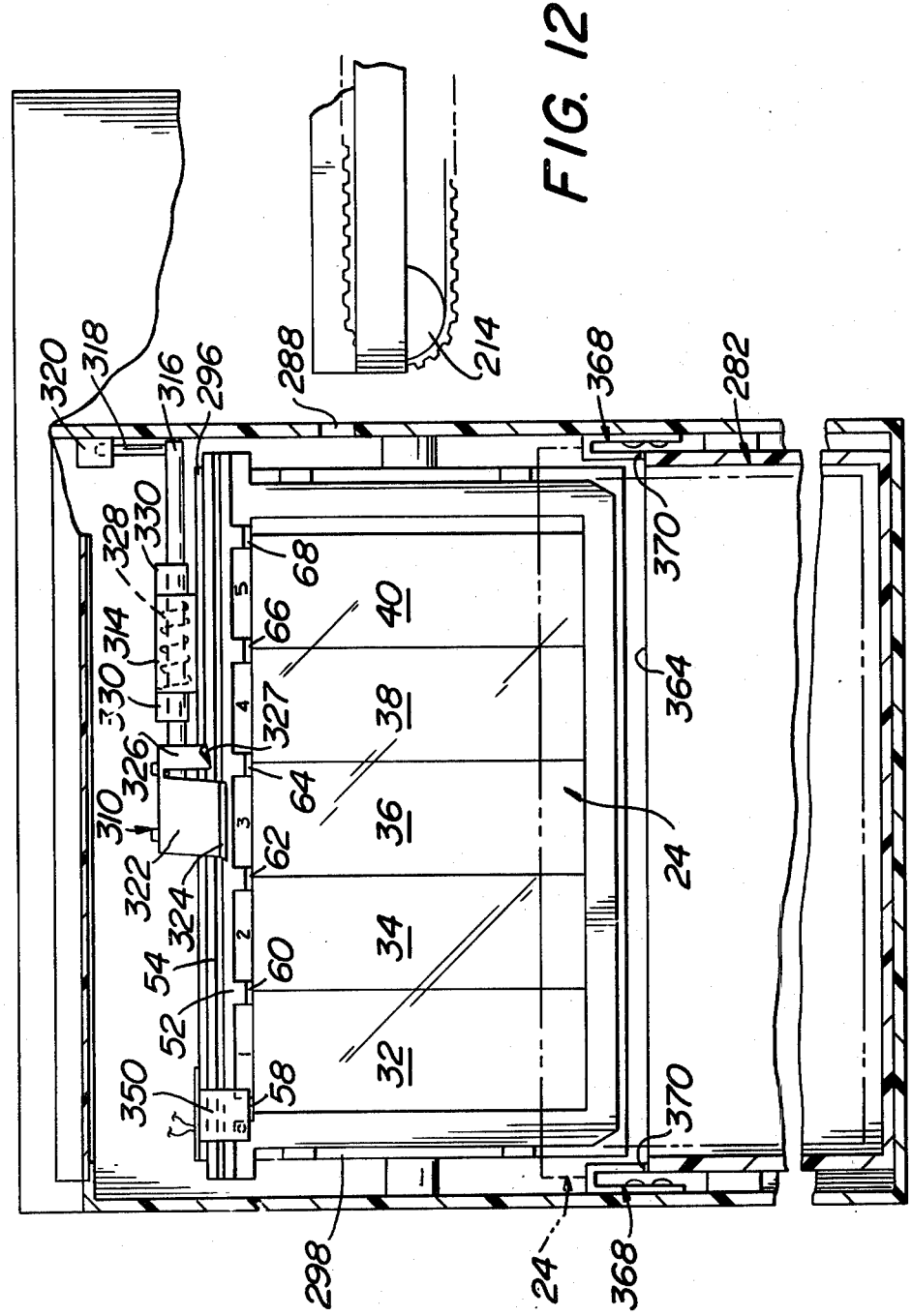
FIG. 12 is a sectional view taken along line 12—12 of FIG. 11.

The drive belt assembly basically comprises a toothed drive belt 210 encircling a pair of rollers 212 (FIG. 6) and 214 (FIG. 12). A linear portion of the belt 210 extends between the rollers 212 and 214 within a longitudinal channel 216 in the top surface of the platen 202. The roller 212 is disposed adjacent the upstream end of the platen, that is, adjacent to the hopper or input section 26, while the roller 214 is located adjacent the downstream end of the platen, that is, adjacent the output station 28. The belt 210 includes a plurality of equadistantly spaced teeth which are configured to mate with the correspondingly sized notches 78 in the underside surface at the top of each tray 24. The channel 216 is disposed immediately adjacent the top flange 206 on the platen. The belt is driven in the counter-clockwise direction, as shown in FIG. 6, by a motor (not shown) under the control of the microprocessor.

The infeed clamping means comprises a spring 220 mounted by a screw 222 on the top flange 206 adjacent the upstream end of the platen. The spring 220 includes a free end portion 224 which is spaced above the top surface of the platen 202 by a distance slightly less than the thickness of the tray 24 at its rib portion 52 and is spaced from the front face of the flange 206 by the distance equal to the distance between the top edge 80 of the tray 24 and the interface of the sloping side of rail 56 with the rib 52. Accordingly, when the tray 24 is ejected through the slot 164 from the hopper the leading end of the tray enters the upstream end of the platen 202 and under the clip 220, with the free edge portion 224 of the clip riding along the line forming the interface of the sloping side of rail 56 and the rib 52. This action holds the tray onto the platen so that the teeth on the belt 210 can positively engage the notches on the underside of the tray. The movement of the belt 210 in the counter-clockwise direction, as shown in FIG. 6, moves the tray further onto the platen and takes over the movement of the tray from the drive belt at the input station.

The movement of belt 210 is precisely controlled so that the tray is moved through a series of precise indexing steps across the platen to successively align each slide on the optical axis of the microscope. To that end, the motor driving the belt is started and stopped on command by the microprocessor and in response to sensor means sensing the position of the tray on the platen. The sensor means will be described in detail later. Suffice for now to state that it works in cooperation with the heretofore identified tic projections 58–68, to stop the movement of the tray at predetermined precise index locations on the platen. To that end, the sensor basically comprises a mechanically actuated, optical sensor adapted to be contacted by each of the tic markers as the tray is carried across the platen. Each time that a tic marker trips the sensor, a signal is provided to the microprocessor, for stopping the rotation of the drive belt 210. This action effectively freezes the tray in the desired position.

Before describing the operation of the sensor, a brief description of the five sequential positions through which each tray is noved on the platen is in order. Thus, when the tray is ejected from the input stage and onto the microscope platen, it is engaged by the drive belt 210 to pull the tray to the left when viewed in FIG. 6.

When the tray has moved to the longitudinal position on the platen in which the first tic marker 58 is aligned with the sensor, a stop signal is provided to stop the drive belt motor, whereupon the tray is halted. In this first position, the first slide 32 is located under an oil dropping mechanism (not shown) so that the slide is oiled in preparation for viewing by the oil immersion objective lens of the microscope. After the oiling has been completed, the drive belt motor is restarted by a signal from the microprocessor to continue moving the tray down the platen. This operation continues until the second tic marker 60 is aligned with the sensor. When this occurs, the tray's movement is again stopped. At this time the second slide 34 is now under the oil drop mechanism and is oiled. At the same time the first slide is disposed over the window in the platen and along the optical axis of the microscope. Automatic analysis of then proceeds in a conventional manner under microprocessor control. When the analysis is complete the microprocessor reinitiates movement of the tray down the platen.

As noted heretofore, the platen also includes means, to be described in detail later, which insures that the tray with the slide being analyzed is registered precisely in a desired position and held firmly in place over the window during the analysis. That means comprises an assembly 230 of a spring clamp and a hold-down leg. The spring clamp acts to bring the top edge 80 of the tray (which has been indexed to a predetermined longitudinal position on the platen) into engagement with the top flange on the platen to effect registration of the tray. The hold-down leg presses down on the slide to hold it securely registered on the platen over the optical axis of the microscope. The assembly 230 is located at a fixed position beside flange 106 adjacent the platen window 204.

After the slide is clamped, automatic analysis of the specimen on the slide proceeds in a conventional manner under the control of the microprocessor. When the analysis is complete, the microprocessor provides a signal to release the hold-down and clamping assembly and restarts the drive belt motor. Accordingly, the tray begins advancing down the platen to the third position. In the third position, the third tic marker 62 is aligned with the sensor to cause the stoppage of the belt's rotation, whereupon the second slide 34 is now disposed over the window on the optical axis of the microscope while the third slide 36 is at the oiling position. The operation of the system then proceeds in the identical manner as described heretofore, until the last slide 40 has been analyzed.

In order to expedite the egress of the tray 24 from the platen after the fifth slide 40 has been analyzed, a second hold-down spring 226 is mounted on the flange 206 adjacent the downstream end of the platen 202. The spring 226 is mounted and constructed in the same manner as spring 220 and operates in the same manner to hold the trailing side of the tray 24 on the platen as the tray is carried off the platen and onto the output station.

The hold-down leg 232 is an elongated member which extends at an angle to the flange 206. The leg terminates at its free end in a foot 234. The leg is pivotably mounted on pivot pins 236 in a yoke 238 extending vertically upward from the central portion of the flange 206 (FIG. 6). The leg 232 is pivotable through a small arc 237 (FIG. 6A) about the horizontal axis through the pivot pins 236 to effect the raising and lowering of the foot 234 from the plane of the platen. The means for raising and lowering the foot comprises a solenoid 239 coupled to the distal end of the leg 232. The solenoid is operated under the control of the microprocessor. A cushion 240 is mounted on the foot 234 and basically comprises an O-ring looped about an opposed pair of ears 242 extending outward from the sides of the foot 236 so that portions 244 of the O-ring extend the full width across the underside surface of the foot 236 as shown in FIG. 6A. The O-ring 240 is preferably formed of a resilient material, such as rubber, so that the surfaces 244 cushion the downward force applied by the foot 236 onto the slide in the tray 24.

As mentioned heretofore, the assembly 230 also includes a spring clamp for insuring that the tray edge 80 is pulled against the flange 206 of the platen so that proper registration can be effectuated. This action also insures that there is good engagement between the drive belt 214 and the notches in the underside of the tray. The spring clamp comprises a generally J-shaped spring 246 (FIG. 6A) mounted on the underside of the leg 232, via a screw 248. The free end 250 of the spring curves inward, i.e., toward the flange 206, and serves as the portion which engages the tray to push the tray's edge 80 against the platen's flange. The spring 246 is mounted so that the free end 250 is elevated with respect to the foot 236 so that when the foot is in contact with a slide mounted in the tray the free end 250 of the spring abuts the vertical face 57 of the tray's rib 52 between an immediately adjacent pair of tic markers. In the partial sectional view of FIG. 6A, there is shown the spring 246 gripping the vertical surface or face 57 of the tray's rib between the first and second tic markers 58 and 60, respectively.

The sensing means for stopping the movement of the tray 24 across the platen at each desired position is shown clearly in FIG. 2A and basically comprises a support and housing 252 mounted on the front face of the platen flange. The housing 252 includes a light sensing element e.g., photocell 258, which is connected to the microprocessor. Disposed immediately opposite to the light sensor 258 is a light source, e.g., a LED, 260 mounted in a support 262. The light source 260 is aligned with the light sensor 258 along an axis 264 and provides a beam of light along that axis.

The microprocessor is arranged to stop the operation of the drive belt motor whenever the light beam 264 is interrupted. The interruption of the light beam 264 is effected by a movable flag element 268 which is mounted on a pivot pin 270 in an upstanding portion of the housing 252. The pivot pin 270 extends perpendicular to the direction of movement of the tray. The flag 268 is a generally planar member having a downwardly extending trip portion 272 and a laterally extending beam interrupting portion 274. The trip portion 272 is arranged to be engaged by each tic marker as a tray is carried across the platen in the direction of the arrow shown in FIG. 2A. This action causes the flag 268 to rotate about axis 270 in the clockwise direction, whereupon the flag's interrupting portion 274 moves out of the light beam path 264. A small leaf spring 276 is mounted, via screw means 278, on the top of the housing 252 and extends over the flag 268 on the opposite side of the pivot pin 270 from the interrupting portion 274. The spring 276 thus serves to bias the flag 268 in the neutral position, shown in FIG. 2A, wherein the portion 274 interrupts the beam of light.

Operation of the sensor is as follows. Assuming that the a tray 24 has just been moved onto the platen and that the belt 214 has engaged the notches in the underside of the tray 24 to commence carrying the tray across the platen. When the leading edge of the first tic marker 58 hits the flag portion 272, the flag portion rotates clockwise in the direction of the arrow shown in FIG. 2A, whereupon the light interrupting portion 274 moves out of the light path to enable the light beam from the source 260 to reach the sensor 258. The sensor provides an electrical signal to the microprocessor, which in turn stops the belt drive motor from rotation. This action immediately stops the tray in the first position. After an appropriate restart signal is given by the microprocessor, the tray is then again moved along the platen until the first tic marker 58 clears the trip portion 272. Once this occurs, the downward bias force provided by the leaf spring 276 on the flag resets the flag to the position wherein the light interrupting portion 274 interrupts that beam of light. When the tray has reached the position wherein the leading edge of the second tic marker 60 contacts the trip 272, the flag is again rotated clockwise, thereby resulting in the stoppage of the tray in the second position. The tray is stopped at each further sequential position in the identical manner.

After the tray is stopped at each position, the foot 286 is brought down by the solenoid control so that its cushion surfaces 244 engage the top surface of the underlying slide in the tray while the J-shaped spring 246 abuts the vertical face 57 of the tray's rib to pull the tray snuggly against the top flange of the platen, thereby insuring proper registration.

The structure of the output station 28 is best shown in FIGS. 3 and 10-13. Before describing the details of the output station, a brief description of its function is in order. The output station is arranged to receive each slide carrying tray 24 after the last slide thereon has been analyzed and to dispense the tray from the apparatus 20 into a storage container or box for subsequent removal. To that end, the output station is arranged to take each tray as it leaves the microscope stage and rotate it through an arc of approximately 90°, until the tray is vertical, to drop the tray into a receiving box for ultimate removal from the apparatus 20. The receiving box is arranged to receive a plurality of trays before it has to be removed from the output station.

The output station also includes means for insuring that each tray is dropped into the box without any impediment or interference of any trays previously dropped into the box.

The output station basically comprises a portion of housing 23 in which there is disposed a tilt-table assembly 280 and the box 282. The tilt-table assembly 280 includes a planar tilt-table 286 which is normally disposed horizontally in the plane of the microscope platen. The portion of housing 23 for the output stage includes an upstream sidewall 284 having a horizontal slot or entrance opening 288 (FIG. 10) immediately adjacent with the upstream end of the table 286. The slot 288 provides a passageway through which each tray passes from the microscope stage to the tilt-table. The tilt-table includes a top flange 296 (FIG. 12) extending along its top edge. A leaf spring 290 is mounted on the inside surface of the front wall 292 of the housing portion 23 adjacent the bottom (front) end 294 of the tilt-table. The leaf spring 290 is arcuate in shape and extends inward from the wall 292 to a position overlying the bottom edge 294 of the tilt-table. The function of the spring 290 is to insure that as each tray 24 is moved from the platen of the microscope stage onto the tilt-table, the bottom side 46 of the tray 24 abuts the spring 290 to force the tray onto the tilt-table with the top edge 80 of the tray in abutment with a top flange 296 of the tilt-table.

The top surface of the tilt-table 286 includes a pair of longitudinally extending ribs 300 which serve to elevate the tray from the surface of the tilt-table, thereby reducing friction between the tray and the tilt-table to facilitate the positioning of the tray onto the tilt-table and its indexing thereacross. The table 206 also includes a flange 298 (FIG. 12) extending along the downstream edge of the table 286.

The means for moving the tray onto the tilt-table 286 basically comprises a toothed drive disk 302 mounted under the tilt-table slightly downstream of its midpoint. A peripheral portion of the disk 302 projects upward through a slot 308 in the table immediately in front of the flange 296. The disk 302 is driven by an electrical motor 304 mounted on bracket portion 306 extending normally from the table. The peripheral portion of the drive disk which extends through the slot 208 is disposed slightly above the plane of the rails 300.

The drive disk 302 is arranged to engage the toothed notches on the underside of each tray as the leading edge of the tray is brought onto the tilt-table 286 by the drive belt of the microscope stage. Once the tray has been moved by the microscope stage drive belt to the position wherein the teeth of the disk 302 engage the toothed notches in the tray, the rotation of the disk takes over the moving of the tray to pull the tray down the tilt table toward the flange 298 at the downstream end. As mentioned heretofore, the action of the leaf spring 290 on the bottom edge tray positions the tray against the flange 296 to insure that there is good engagement between the drive disk 302 and the teeth of the tray.

When the tray has moved down the tilt-table to the point at which the elongated recess 82 (FIG. 5) in the underside of the tray is located over the rotating disk 302 the tray stops moving, that is, it "idles".

The tilt-table assembly also includes releasable clamping means which holds the tray 24 down onto the drive disk 302 during the movement of the tray across the tilt-table. This action further insures good engagement between the rotating disk and the toothed undersurface of the tray. The clamp, as will be described in detail later, is arranged to release the tray during the tilting operation of the table to allow the tray to slide off the table and drop into the box 282, as will be described later.

Optical sensing means, also to be described later, is mounted on the tilt-table along the top portion thereof contiguous with the downstream end. The sensing means is arranged to sense the first tic marker 58 of the tray 24 when the tray is disposed against the downstream table flange to provide a signal to the microprocessor for initiating the tilting operation.

Figure 10:
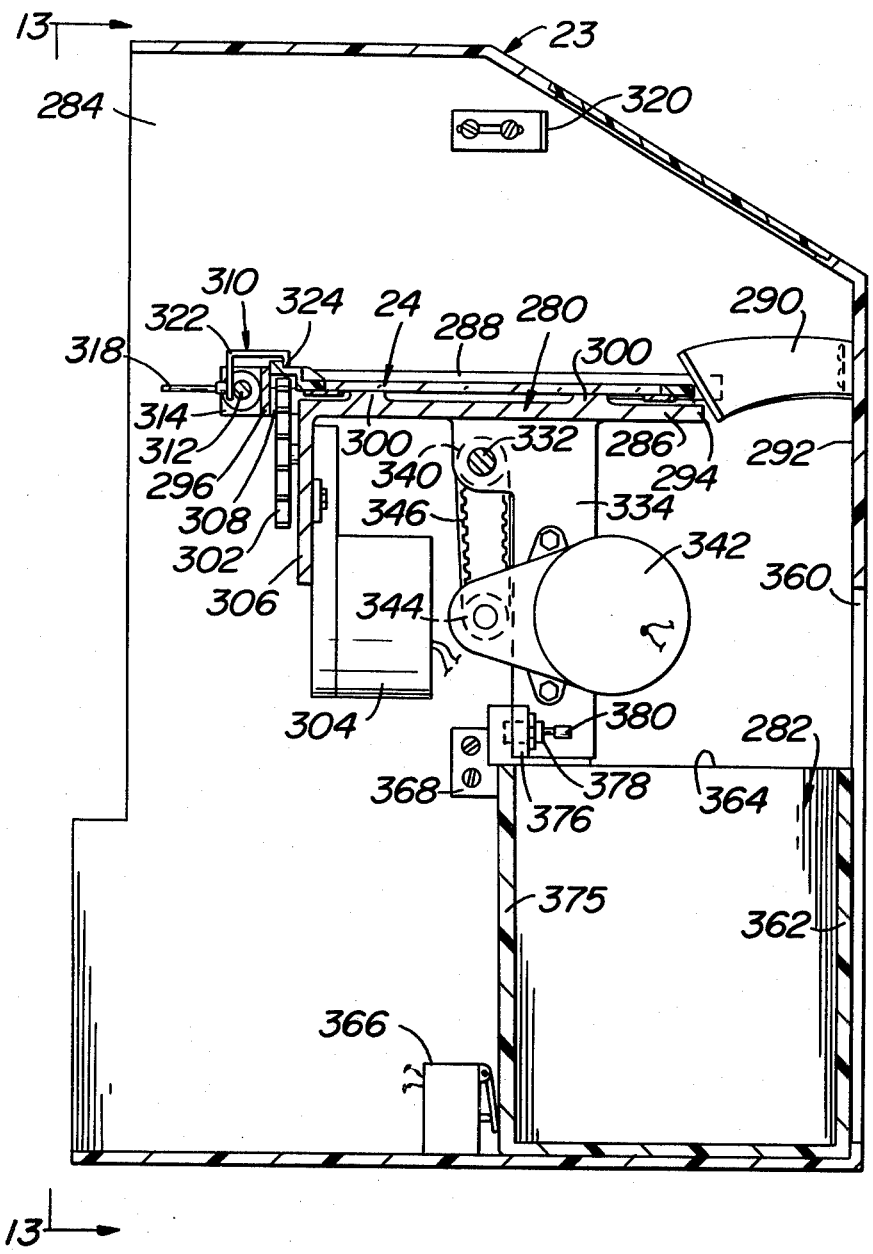
FIG. 10 is an enlarged sectional view taken along line 10—10 of FIG. 1 and showing the output stage at an initial point in its cycle of operation.

Before describing the tilting operation, the construction of the means for clamping the tray on the table will be described. To that end, the clamping means basically comprises a clamping bar 310 fixedly secured to a horizontally mounted shaft 312. The shaft is journaled in a block 314 mounted on the backside of the tilt-table's top flange 296 (FIGS. 10 and 12). The shaft 312 is thus able to pivot about its horizontal axis. The shaft 312 includes a first end 316 from which a finger 318 projects radially outward. The finger 318 is arranged to abut a flanged stop 320 mounted on the interior of the housing portion over the upstream side of the tilt-table. The clamping bar 310 is mounted on the end of shaft 312 opposite to the end 316 and basically comprises a generally horizontally disposed portion 322 (FIG. 10) terminating at its free end in a downwardly extending lip 324. The lip 324 is arranged to engage the tapered face 56 of the tray's rail 54 when the clamping means is in the pivoted downward or "clamped" position. As shown in FIG. 12, the clamp bar 310 also includes a guide arm 326 projecting outward in the same plane as portion 322 and disposed immediately laterally thereof. The guide arm 326 includes a winged free end or tip 327.

A helical tension spring 328 is mounted within the block 314 to bias the shaft 312 in the clockwise direction, as shown in FIG. 10, so that the clamping lip 324 is normally in the "clamped" position for engagement with the rib of tray 24. A pair of locking sleeves 330 are mounted on the shaft 312 on either side of the block 328 to hold the shaft at a fixed longitudinal position with respect to the tilt-table.

Figure 11:
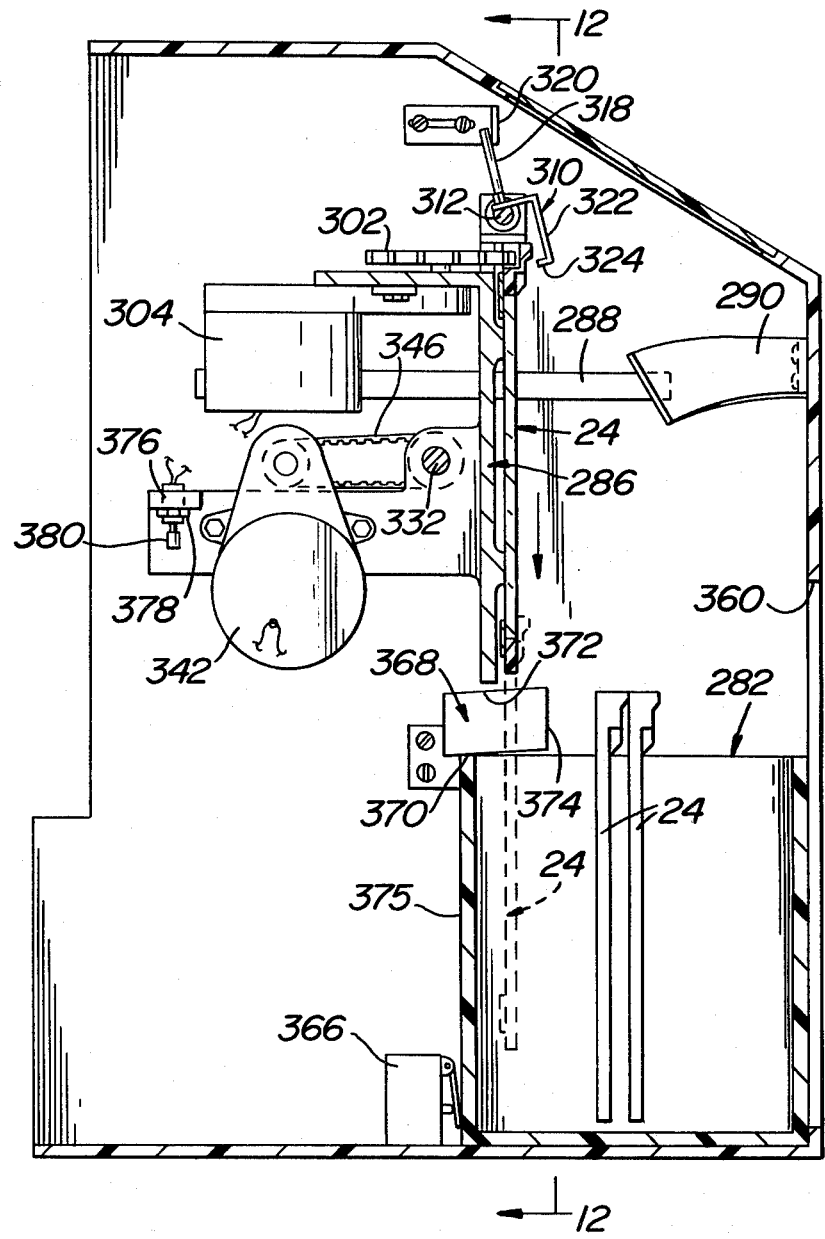
FIG. 11 is a side elevational view, like that of FIG. 10, but showing the output station during a subsequent point in the cycle of operation.

The tilt-table 286 is arranged to be pivoted from the horizontal position shown in FIG. 10 to a generally vertical position shown in FIG. 11 to enable the tray 24 disposed thereon, to drop into the underlying box 284. After the tray is dropped, the microprocessor reverses the operation of the table to enable it to pivot upward back to the horizontal position shown in FIG. 10 so it is ready to receive another tray from the microscope stage.

The tilt-table 286 is mounted on a horizontally disposed shaft 332 (FIG. 13), via a pair of bracket arms 334 and 336 which project downward from the underside of the table 286. The shaft extends through a pair of aligned bearing openings in the arms 334 and 336, with each end of the shaft being fixedly secured within a respective mounting sleeve 338. One sleeve 338 is mounted on the inside surface of the downstream sidewall of the housing portion 23, while the other bearing is mounted on the inside surface of the upstream sidewall of the housing.

A pulley 340 is fixedly mounted on the shaft 332 adjacent the upstream side of the table. An electric motor 342 is mounted on the bracket 336. A drive pulley 344 is mounted on the rotary output shaft of the motor and aligned with pulley 340. The pulley 344 includes plural teeth about its periphery, as does the pulley 340. A toothed timing belt 346 extends about the drive pulley 344 and the pulley 340. As will be appreciated by those skilled in the art, operation of the motor 342 effects the rotation of the output pulley 344. Since the pulley 340 is fixedly secured to the shaft 332, which is in turn fixedly secured in the blocks 338, the operation of the motor causes the pulley 344 to roll around the timing belt 346, whereupon the table pivots downward about the axis of shaft 332.

The means for sensing the positioning of the tray in the "idle" position comprises an optical sensing assembly 350 (FIG. 12) which is mounted on the tilt-table contiguous with the top and downstream sides thereof. The sensing assembly 350 is arranged to provide an electrical signal to the microprocessor when a light beam is broken by the alignment of the leading edge of the first tic marker 58 at the sensor, which action occurs when the tray has reached the "idle" position.

Operation of the heretofore described components of the tilt-table assembly is as follows: The tilt table assembly is initially in the horizontal or "home" position shown in FIG. 10 prior to receipt of a tray 24 from the microscope stage. As a tray 24 is inserted into the output stage housing portion through slot 288 under the impetus of the platen's drive belt 210, the tray slides onto the rails 300 on the tilt-table and moves thereacross. The bottom edge of the tray engages the arcuate spring 290, whereupon the tray is pushed upward on the tilt-table 86 until the top edge 80 of the tray abuts the flange 296 at the top of the tilt-table. When the leading edge of the tray reaches the guide arm 326, it is directed to pass under the guide arm by the winged tip 327. This action insures that the leading edge of the tray is aligned to pass under the downwardly extending lip 324 of the pivoting clamp bar 310 without impediment. The rounded leading edge of the rib 52 and the rail front face 56 expedite the entry of the tray under the clamp bar lip 324. As the leading edge of the tray passes under the clamp bar 310, the downwardly extending lip 324 engages the sloping front face 52 of the tray's rail to hold the tray along the top flange 296. When the leading edge of the tray reaches the drive disk 302, the teeth on the disk engage the notches on the underside of the tray to pull the tray toward the downstream side of the table. Thus, once the disk engages the notches on the underside of the tray, further movement of the tray is effected by the disk and not by the drive belt at the microscope stage.

Continued rotation of the disk brings the tray to the "idle" position, whereupon the elongated recess 82 in the bottom of the tray overlies the disk so that the tray does not move any further. When the tray reaches the "idle" position, the optical sensor 350 senses the presence of the first tic marker 58 and provides a signal to the microprocessor. Upon the receipt of the signal, the microprocessor provides a command to initiate the operation of the motor 342. When the motor 342 commences rotation, the table pivots downward in the clockwise direction from the position shown in FIG. 10 to the position shown in FIG. 11.

During the rotation of the tilt-table from the position shown in FIG. 10 to the position shown in FIG. 11, the tray 24 is precluded from sliding off the table by the grip placed on its rail by the downwardly extending finger 324 of the clamp assembly 310. Immediately prior to reaching the vertical position, the radially extending finger 318 on the clamp shaft 312 engages the projecting stop 320. Accordingly, continued rotation of the tilt-table in the clockwise direction causes the relative counter-clockwise rotation of the clamp shaft 312. This action results in the release of the tray's rail by the clamping lip 324, as shown in FIG. 11. When the clamp releases, the tray drops vertically in the direction of the arrow shown in FIG. 11 toward the storage box 282 disposed therebelow.

As can be seen in FIG. 10, the box 282 is located within the housing at the output station contiguous with the front wall thereof. An opening 360 is provided in the front wall to enable an empty box to be inserted within the housing for receipt of the trays and for enabling a box full of trays to be removed.

The box 282 includes a generally rectangular sidewall 362 whose top peripheral edge or rim is denoted by the reference numeral 364. A microswitch 366 is mounted within the housing on the bottom wall and is arranged to sense the presence of a box 282 therein and to provide a signal indicative thereof to the microprocessor. To that end the microswitch includes an activating arm which is depressed by the backwall of the box when the box is in position within the housing as shown in FIG. 10. The box is held down in position by a pair of arms 368 (FIG. 12) mounted on the opposed sidewalls of the housing 23 at the output station, that is, the upstream sidewall and the downstream sidewall.

As shown in FIG. 11 the underside surface 370 of each arm 368 slopes downward from the front portion, that is the portion disposed closest to the front of the housing 280 to the rear portion, and with the spacing between the bottom wall of the housing at the rear portion of the surface 370 being equal to the height of the sidewall of the box 282 so that when the box is inserted through opening 360 and under the surfaces 370, it is wedged in position.

The arms 368 also serve to insure that no jamming of trays occurs during their successive dropping into the box. To that end, each arm 368 also includes an upper surface 372 (FIG. 11) which inclines downward front to back. The arms 368 are mounted on the respective housing sidewalls and aligned with the plane of the tilt-table 286 when the table is in the vertical position as shown in FIG. 11. The top surface 372 of each arm extends inward from the associated housing sidewall to serve as a catching surface for a respective ear 50 of the tray which is dropped. The spacing between the two opposed arms 368 is less than the spacing between the outer edges of the ears 50 but greater than the spacing between the sides of the tray. Accordingly, as the tray 24 drops from the position shown in full in FIG. 11, the ears of the tray are stopped by the top surfaces 372 of the arms so that the tray hangs on the arms in the position shown by the phantom lines in FIG. 11. Inasmuch as the top surfaces 372 are inclined downward from the front to the rear, the tray which is suspended on the arms is held against the surface of the now vertically disposed tilt-table.

The forward edge 374 of each arm 368 is disposed over the opening in the box substantially to the front of the box's back wall 375. Accordingly, when the tilt-table is rotated under the microprocessor control in the counter-clockwise direction from the vertical position shown in FIG. 11 back to the "home" or horizontal position shown in FIG. 10, the bottom portion of the tilt-table pushes on the tray suspended on the arms so that the tray slides along the arm surfaces 372 until it reaches the front edge 374, whereupon the tray drops vertically into the underlying box 282. The ears of the tray then engage the underlying portions of the rim of the box to suspend the tray in the box at a location below the front edge 374 of the arms 368. Thus, the arms insure that there is an open space to the rear of the box 282 for receipt of the next tray.

Figure 13:
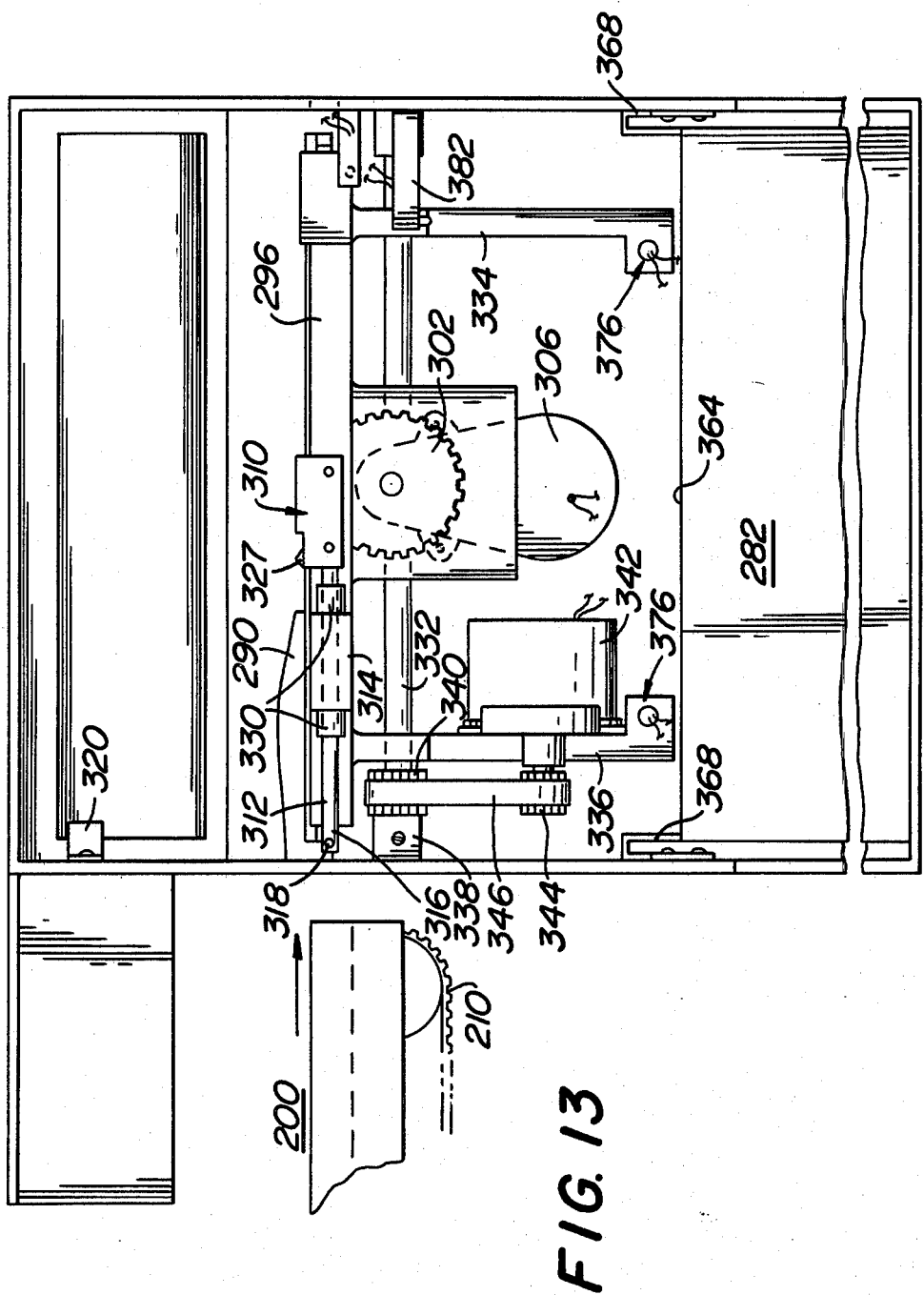
FIG. 13 is a sectional view taken along line 13—13 of FIG. 10.

As can be seen in FIGS. 11 and 13, each of the brackets 334 and 336 includes at its lower end, pushing means 376. The pushing means 376 includes electrical switch means 378 which are connected to the microprocessor. The pushing means 376 are arranged to push those trays which are suspended within the box 282 toward the front of the box, thereby clearing a space to the rear of the box for receipt of the next tray to be dropped. To that end, each pusher 376 is mounted so that it extends parallel to the plane of the tray and forward of the axis about which the tilt-table rotates, namely, shaft 332. Accordingly, as the table rotates from the vertical position shown horizontal or home position shown in FIG. 10, the pushers engage the bottom surface of the tray 24 suspended rearmost within the box 282. Continued upward rotation of the table causes the pushers to apply a force to said surface to push all of the trays suspended in front of it on the box forward until the pushers' arc clears the last tray. The tilt-table continues its upward rotation until it reaches the "home" position.

Each pusher switch 378 includes an actuating button 380 which serves as the surface that contacts the trays to push them forward in the box. The button 380 is depressable when sufficient force is applied thereon to close the switch. The closure of the switch provides a signal to the microprocessor. The pusher switches operate as follows, when the box 282 is full of trays 24 so that the trays cannot be pushed further forward by the pushers during the rotation of the table back to the home position, the attempted continued rotation of the table back to the "home" position causes the buttons to be depressed, thus closing the switches. This action is sensed by the microprocessor to prevent further operation of the system until the box 282 full of trays is removed and an empty box replaced.

As can be seen in FIG. 13 a "home" position microswitch 382 is mounted on the inside surface of the downstream sidewall of the housing portion adjacent bracket 334. The microswitch is arranged to be closed by contact with the bracket when the table 286 is horizontal, i.e., in the "home" position. The closure of the switch provides an electrical signal to the microprocessor.

Figure 14:
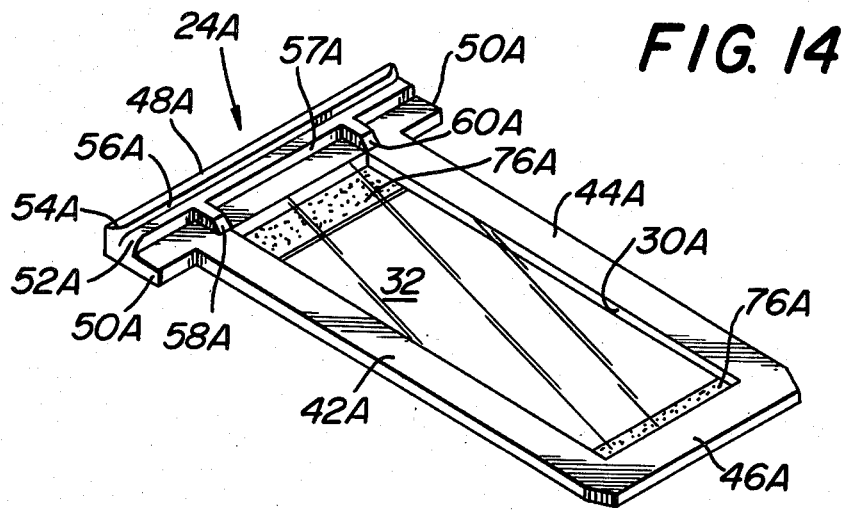
FIG. 14 is a perspective view of the top side of an alternative embodiment of the tray of the instant invention.
Figure 15:
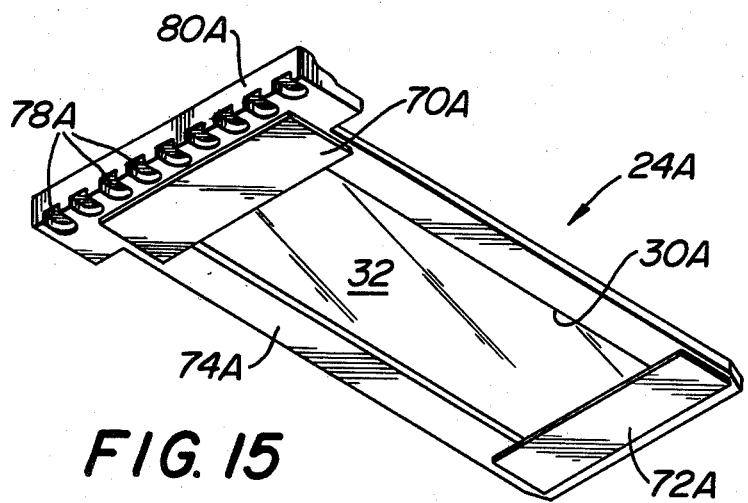
FIG. 15 is a perspective view of the underside of the tray shown in FIG. 14.

In FIGS. 14 and 15, there is shown a preferred embodiment of a single slide holding tray constructed in accordance with the instant invention. That tray is denoted by the reference numeral 24A. Tray 24A is in most material aspects identical to tray 24. Thus, in the interest of brevity, the portions of tray 24A which correspond to portions of tray 24 are given the indicia "A" after the reference numeral identifying those portions. The difference between tray 24 and 24A is that in the latter, the window is configured to receive only a single slide and thus only includes two tic projections 58A and 60A. In addition, there is no enlarged recess located in the middle of the longitudinally extending row of notches 78A in the underside surface of tray 24A.

The tray 24A is specifically designed to be used for "stat" or special examinations in which the tray is manually placed on the microscope platen by an operator. The tray is carried by the carrier means on the microscope platen to the point where its first tic projection 58A engages the sensor to stop the tray with slide 32 within the field of view of the microscope. Automatic analysis then occurs. After the automatic analysis, the tray is fed off of the platen and manually removed by the operator. Thus, the tray 24A does not make use of either the input or output station of the system 20, but does make use of the indexing mean at the microscope station to effect alignment and registration of the slide thereat.

The microprocessor control (not shown) of the analyzer coordinates the operation of each of the stations of the system 20 so that various operations can occur simultaneously, e.g., the feeding of a tray to the microscope stage while a tray is fed to the output. This "parallel" operation of the transportation system enables one to achieve a high rate of through-put of slides with relatively low-speed transport mechanisms. The use of relatively low-speed transport mechanisms enables one to achieve a high degree of reliability at a relatively low cost.

Moreover, since the slide trays of the instant invention are arranged to support a plurality of slides therein, one is enabled to reduce the time involved in indexing sequential slides within a tray down to approximately one second per slide, while the indexing of successive trays on the platen can be accomplished in approximately ten seconds.

Another advantage of the instant invention is that the slide tray and the indexing mechanism at the microscope platen cooperate so that each tray is precisely registered on the microscope platen. Accordingly, any selected portion, e.g., an individual blood cell, of a specimen on a slide within a tray which had earlier been analyzed (and whose x and y coordinates of the selected portion had been placed in memory), can be automatically brought back onto the platen and into the field of view for reexamination. This action is accomplished by the cooperation of the tic markers and the sensors to automatically register the slide on the platen. Thus, to view a selected portion of the slide, all that is required is that the microprocessor move the platen carrying the registered tray to the desired x-y coordinates. With the instant invention, one can achieve precision alignment repeatability to within ±50 microns.

Another advantage of the slide-holding tray of the instant invention is that it enables one to stain the slides held within the frame by feeding a tray having unstained slides to a staining station including gripping means similar to that used at the output station.

A still further advantage of the slide-holding tray of the instant invention is that the tray enables oiled slides to be stored, e.g., stacked, conveniently without resulting in their sticking together or fusing as do unmounted, oiled slides which are stacked on top of one another.

Without further elaboration, the foregoing will so fully illustrate my invention that others may, by applying current or future knowledge, readily adapt the same for use under various conditions of service.

What is claimed as the invention is:

1. A system for receiving a horizontally disposed tray having at least one specimen-bearing slide therein and for dispensing said tray into a storage container, said tray comprising a generally planar member having engagement means comprising a row of plural, longitudinally disposed notches, said system including tilt-table means having carrier means for engaging said engagement means to move said tray to a predetermined idle position on said table, said carrier means comprising a toothed drive disk located at an intermediate point on said table, said tilt-table means being pivotable from a horizontal orientation wherein said tray is received to a substantially vertical orientation wherein said tray is dispensed into said container, said table pivoting to said vertical orientation when said tray is at said predetermined idle position of said table.

2. The system of claim 1 wherein said tray includes an elongated recess in said row of notches to preclude further engagement between said drive disk and said notches when said recess is contiguous to said disk, whereupon said tray remains at said predetermined idle position.

3. The system of claim 1 including releasable clamping means to hold said tray on said table until said table is substantially vertical at which time said tray drops for insertion in said box.

4. The system of claim 3 wherein said tray includes a clamp receiving surface and wherein said clamping means comprises a pivotable bar normally biased into engagement with said surface.

5. The system of claim 4 additionally comprising means to pivot said bar out of engagement with said surface when said table is substantially vertical.

6. The system of claim 1 wherein said tray includes extending ear portions and wherein said system additionally comprises catching means adapted to catch said tray as it drops and to suspend said tray thereon.

7. The system of claim 6 wherein said container is located below said catching means.

8. The system of claim 7 wherein said table is arranged to pivot back to said horizontal orientation after said tray is dropped, whereupon said table pushes the suspended tray off of said catching means so that said tray falls into said container.

9. The system of claim 8 wherein when said tray falls into said container it is suspended by its extending ear portions and wherein said system additionally comprises pusher means to push the trays suspended in said container to a forward location therein.

10. The system of claim 9 additionally comprising means to sense of when said container is full of trays.

11. The system of claim 1 wherein said tray includes index marker means associated with said slide and wherein said table includes sensor means for sensing the position of said index marker means when said tray is in said predetermined idle position.

12. A system for transporting a tray holding at least one specimen-bearing slide to and from a microscope stage and for indexing said tray at said stage to at least one predetermined index position thereon, said tray comprising a frame defining a window in which said slide is fixedly secured, index marker means associated with said slide and engagement means, said system comprising an input station, indexing means at said microscope stage, and an output station, said input station comprising hopper means to receive a stack of trays, first carrier means located within hopper means for sequentially carrying trays out of said hopper means and onto said microscope stage and feeding means for sequentially dispensing trays from said stack to said carrier means, said indexing means at said microscope stage including second carrier means for moving said tray across said stage and first sensor means for cooperation with said second carrier means, said index marker means being arranged to activate said first sensor means to stop said second carrier means from moving said tray when said index marker means is in a first predetermined position on said stage, said second carrier means being arranged to carry said tray horizontally from said predetermined index position to said output station, said output station being arranged to receive said horizontal tray for dispensing it into a storage container, said output station comprising tilt-table means pivotable from a horizontal orientation in which said tray is received to a vertical orientation in which said tray is dispensed into said container, said table pivoting when said tray is in a predetermined idle position on said table.

13. The system of claim 12 wherein said input station additionally comprises means for sensing the presence of a stack of trays within said hopper.

14. The system of claim 13 wherein said input station additionally comprises means for sensing the presence of a tray or said first carrier means.

15. The system of claim 12 wherein said feeding means comprises first and second moveable means, said first moveable means being disposed above said second means and arranged to be selectively extended into said hopper to hold said tray above it and to be selectively retracted from said hopper to allow the lowermost tray of said stack to drop to said second moveable means, said second moveable means being arranged to be selectively extended into said hopper to hold said lowermost tray above it and to be selectively retracted from said hopper to allow said lowermost tray to drop onto said first carrier means.

16. The system of claim 15 wherein said first and second moveable means are coupled together and arranged so that two trays do not drop at the same time.

17. The system of claim 16 wherein each tray is a generally planar member having an underside surface, said surface including a recess therein into which said first moveable means is arranged to be extended to separate the tray being dropped onto said second moveable means from the remaining trays of said stack.

18. The system of claim 12 wherein said engagement means of said tray comprise a plurality of longitudinally disposed notches and wherein said second carrier means comprises a toothed drive belt having a linear portion extending along said stage.

19. The system of claim 12 additionally comprising egress clamp means for ensuring that there is good engagement between said second carrier means and said engagement means as a tray is brought onto the stage for movement thereacross to said predetermined index position.

20. The system of claim 19 wherein said carrier means is arranged to move said tray off said stage and additionally comprising egress clamp means for maintaining good engagement between said carrier means and said engagement means as said tray is moved off of said stage.

21. The system of claim 12 wherein said indexing means at said microscope stage additionally comprises selectively actuatable hold-down means and clamping means and wherein said tray includes surface means adapted to be selectively engaged by said clamping means to move said tray into precise registration in said indexed position, while said hold-down means selectively engages said slide to hold said slide down on said stage at said indexed position.

22. The system of claim 21 wherein hold-down means comprises a slide-engaging foot and is pivotably mounted on said stage and wherein said clamping means comprises a spring mounted on said leg for engaging said surface portion contiguous with said index marker means.

23. The system of claim 12 wherein said tilt-table at said output station includes third carrier means and wherein said tray includes engagement means to be engaged by said third carrier means to move the tray to said first predetermined position on said table.

24. The system of claim 23 wherein third carrier means comprises a toothed drive disk located at an intermediate point on said table and wherein said tray comprises a generally planar member and said engagement means comprise a row of plural longitudinally disposed notches.

25. The system of claim 24 wherein said tray includes an elongated recess in said row of notches to preclude further engagement between said drive disk and said notches when said recess is contiguous to said disk, whereupon said tray remains at said predetermined idle position.

26. The system of claim 12 wherein said output station additionally comprises releasable clamping means to hold said tray on said table until said table is substantially vertical at which time said tray, drops for insertion in said box.

27. The system of claim 26 wherein said tray includes a clamp receiving surface and wherein said clamping means comprises a pivotable bar normally biased into engagement with said surface.

28. The system of claim 27 wherein said output station additionally comprises means to pivot said bar out of engagement with said surface when said table is substantially vertical.

29. The system of claim 12 wherein said tray includes extending ear portions and wherein system additionally comprises catching means adapted to catch said tray as it drops and to suspend said tray thereon.

30. The system of claim 29 wherein said container is located below said catching means.

31. The system of claim 30 wherein said table is arranged to pivot back to said horizontal orientation after said tray is dropped, whereupon said table pushes the suspended tray off of said catching means so that said tray falls into said container.

32. The system of claim 31 wherein when said tray falls into said container, it is suspended by its extending ear portions and wherein said system additionally comprises pusher means to push the trays suspended in said container to a forward location therein.

33. The system of claim 32 additionally comprising means to sense when said container is full of trays.

34. The system of claim 12 wherein said output station additionally comprises sensor means for sensing the position of said index marker means when said tray is in said predetermined idle position.

* * * * *

UNITED STATES PATENT AND TRADEMARK OFFICE
CERTIFICATE OF CORRECTION

PATENT NO. : 4,453,807
DATED : June 12, 1984
INVENTOR(S) : Albert A. Faulkner and John C. Bouton It is certified that error appears in the above-identified patent and that said Letters Patent is hereby corrected as shown below:

On the title page insert:

--(73) Assignee, SmithKline Beckman Corporation, Philadelphia, Pennsylvania--.

Signed and Sealed this

Fifteenth Day of October 1985

[SEAL]

Attest:

Attesting Officer

DONALD J. QUIGG

Commissioner of Patents and Trademarks—Designate